June 9, 1931. L. LAVOIE Re. 18,094

FEEDING MEANS FOR FLUID FUELS OR THE LIKE

Original Filed April 2, 1927

WITNESSES
Erich Moebius.
Henry H. Ott

INVENTOR
Louis Lavoie.
BY Munn & Co
ATTORNEYS

Reissued June 9, 1931

Re. 18,094

UNITED STATES PATENT OFFICE

LOUIS LAVOIE, OF QUEBEC, QUEBEC, CANADA

FEEDING MEANS FOR FLUID FUELS OR THE LIKE

Original No. 1,774,714, dated September 2, 1930, Serial No. 180,472, filed April 2, 1927. Application for reissue filed January 6, 1931. Serial No. 507,010.

This invention relates generally to fluid feeding means, and broadly comprehends a fluid feeding apparatus which embodies a feed chamber having a controlled intake for admitting the fluid thereto and maintaining the same at a predetermined level and means for creating a suction or partial vacuum in said feed chamber and its intake to draw fluid from a subterposed supply or reservoir to said feed chamber, said means also operating to create a suction or partial vacuum for feeding the liquid from the feed chamber to the point of consumption, the feeding of the liquid to the feed chamber and from the same being caused by relatively different degrees of suction or vacuum.

The invention more particularly resides in a fluid fuel feeding and atomizing apparatus for furnaces or their equivalent, which affords an easily controlled mechanically operated device of simple construction which will be safe in operation and in which the number of moving parts necessary for feeding and forcing the fuel in vaporized or atomized form to the furnace will be reduced to a minimum.

According to my invention, the force necessary for the vaporization or atomization of the oil is obtained by regulating the suction or partial vacuum within the feed chamber or supply tank and the oil outlet therefrom, so that the pressure difference between them is such that the oil, as it is drawn from the supply tank, is broken up or atomized or mixed with the necessary amount of air for combustion of the fuel as it is fed or forced into the furnace. The suction or partial vacuum created within the tank is maintained at a predetermined value necessary for raising the oil from a subterposed storage tank into a superposed supply tank or feed chamber, and means are provided for maintaining the oil at a predetermined level within the supply tank or feed chamber. The vaporized fuel is forced into the furnace by a power driven air pump, the outlet from which terminates in a nozzle which is surrounded by the discharge pipe of a blast fan, the air from which assists in supporting the vaporized fuel within the furnace and, also, supplies sufficient air to assist in the complete combustion of the fuel.

In the drawings which illustrate one form of my invention:—

Figure 1:
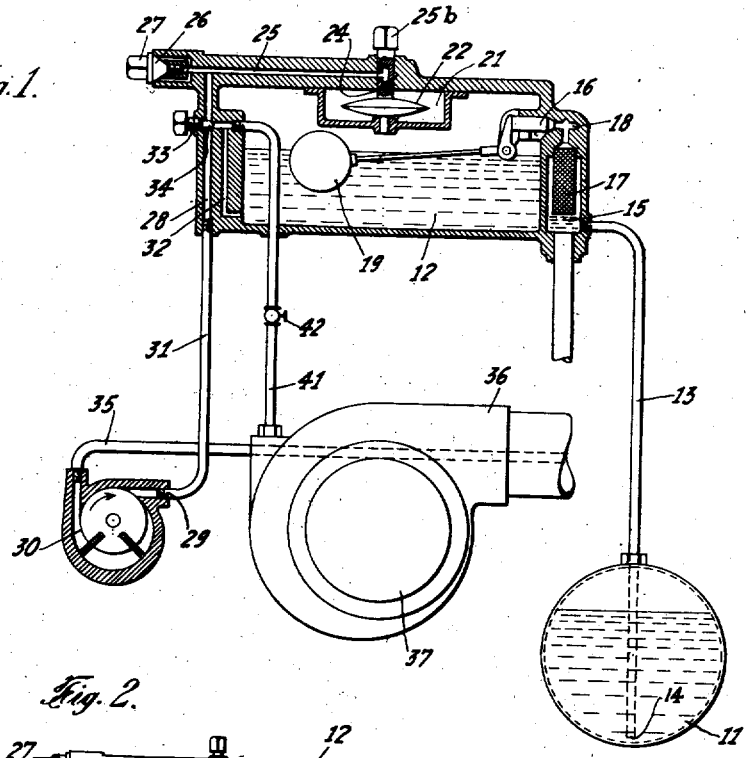
Figure 1 is a part sectional side elevation of my improved apparatus for feeding and atomizing fuel for a furnace.
Figure 2:
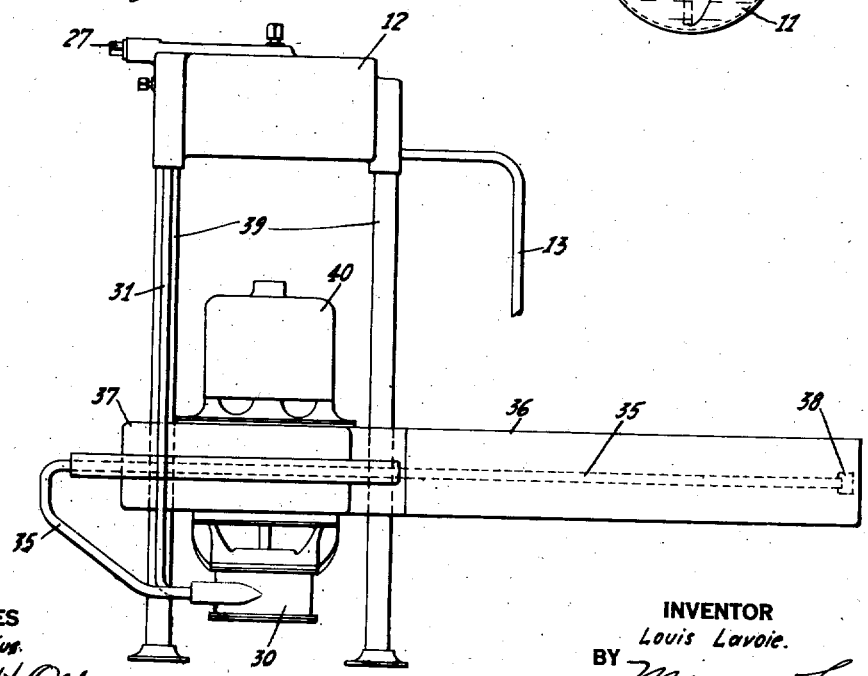
Figure 2 is a side elevation of the device showing the supports.

Referring more particularly to the drawings, and in particular to Figures 1 and 2, 11 designates a storage tank for fuel which is connected to the furnace fuel supply tank or feed chamber 12, by means of the pipe 13. The free end 14 of the pipe 13 projects into the tank 11 and is spaced a short distance from the bottom thereof, so that all the oil may be withdrawn by the suction or partial vacuum set up in the fuel supply tank or feed chamber 12. The other end of the pipe communicates with a filtering chamber 15 formed adjacent to the supply tank 12 and communicating with the interior of the tank 12 through the passageway 16, one end of which is covered by any of the well-known filtering mediums, such as the gauze screen 17. The opening into the tank 12 is controlled by a needle valve 18, which is connected to a float 19, the rise and fall of which closes or opens the needle valve to maintain a predetermined level in the supply tank or feed chamber 12. The outlet from the passageway 16 is positioned above the predetermined level of the fluid in the supply tank.

In order to provide means causing a suction or partial vacuum within the feed chamber or fluid supply tank 12 to effect the lifting of the fluid from the subterposed storage tank 11 whenever the passageway 16 is opened by the float controlled valve, a conduit 25, leading from a suction creating means, communicates with the chamber or tank 12 above the maximum fluid level. As illustrated, the conduit preferably communicates with the tank or chamber 12 through a controlling valve structure which defines a chamber 21, within which is mounted an atmospheric diaphragm 22. The diaphragm has a projection which fits into an aperture in the wall of the chamber 21 on its under side. The upper side of the diaphragm has a conical projection which fits into a recess 24 formed on the under side of a low vacuum regulating screw 25*b*. The recess 24 communicates with the main suction or vacuum line 25 formed in the wall of the tank 12. In the drawings, the line or conduit 25 is horizontally disposed and communicates with the atmosphere through the end 26, which may be threaded, and closed by a screw operated conically-shaped valve 27. A conduit 28, which may be defined by a vertically disposed passageway in the side wall of the tank 12, communicates at its upper end with and extends downwardly from the line or conduit 25, and a pipe 31 communicates with and leads from the lower end of conduit 28 to the intake or suction side of a suitable pump 30. A fluid feed conduit 32, preferably defined by a vertical passageway in the previously mentioned side wall of the tank 12, communicates at its lower end with the tank or chamber 12 adjacent the bottom thereof and extends upwardly therefrom and communicates with the conduit 28 at a point above the predetermined level of the fluid in said supply tank or feed chamber 12. A suitable valve 33 is provided at the juncture of the conduits 28 and 32 and constitutes a common means for respectively regulating the degree of suction or vacuum that acts to withdraw and feed the fluid from the supply tank or feed chamber 12 through the conduits 32 and 28 to the point of consumption and for effecting a differential, and preferably a reduced, degree of suction or vacuum in the conduit 28 beyond or above the juncture of the conduit 32 therewith, to set up the necessary suction or partial vacuum in the supply tank or feed chamber 12 above the predetermined level of the fluid therein for the purpose of feeding the fluid from a subterposed source of supply or reservoir. The outlet 35 of the air pump, which is preferably of the rotary blade type as shown, passes through the wall of the outlet pipe 36, from an air blast fan 37, and terminates in a spraying nozzle 38 of any desired form. The outlet pipe 36 entirely surrounds the air pump outlet pipe. In the drawing shown in Figure 2, I have shown a simple arrangement for mounting the various parts of my improved atomizing and feeding device. The fuel feed tank is mounted on a plurality of pipe supports 39. The blast fan air pump and the motor 40 which drives same, are all coupled together and mounted slidably on the supports, so that the height of the discharge ends of the air fan and pump may be quickly and easily adjusted to suit the height of the furnace opening. The connections between the air pump and the oil feeding chamber may be made to suit the distance between them, or flexible tubing may be conveniently used for this purpose. A by-pass pipe 41 may be connected to the discharge side of the air pump and to the oil feed outlet in the oil feed chamber above the oil level. A suitable regulating valve 42 may be mounted in the said pipe 41.

In operation the air pump sets up a vacuum in the main vacuum line and in the fuel feed supply tank, and the vacuum in the tank is maintained at a predetermined value by means of the bellows type atmospheric diaphragm mounted on the upper side of the tank. By regulating the screw above the diaphragm, in the device shown in Figure 1, the vacuum within the tank may be regulated to a sufficient degree to raise the oil from the storage tank into the fuel feed tank. The level of the oil within the feed tank is kept below the inlet thereto, by means of the float valve, so that if the vacuum is broken, the oil will be held within the fuel feed tank. As a further means of controlling the pressure, the valve in the by-pass may be regulated to increase the velocity of the oil discharge. The vaporized fuel is drawn into the fan and delivered to the furnace through the nozzle, and air necessary for complete combustion of the fuel may be supplied by the blast fan. The device is very easily mounted in position and may be adjusted to the required height to suit any type of furnace. The device may be mounted for right or left hand position. It will be readily seen that there are very few movable parts used in the construction which is simple and compact and very easily installed.

It will be readily understood that modifications may be made in the construction without departing from the spirit of the invention and such modifications may include the removal of the float valve and the needle valve from the filtration chamber, as it has been found from experiments that once the oil has filled the oil feeding chamber and the diaphragm has closed the opening to the suction line, the oil is fed to the pump without any variation and the valve from the filtration chamber may be opened sufficiently to regulate the supply so that it coincides with the discharge.

Having thus described my invention, what I claim is:

1. In a fuel feeding device, an oil tank, an air pump, an enclosed channel connecting the air pump with the tank, an atmospheric diaphragm mounted in the tank to regulate the degree of vacuum therein, adjustable means for regulating the degree of vacuum in the said channel, means for controlling the level of the oil in the tank, an oil outlet, one end of which communicates with the bottom of the tank, and the other end communicates with the channel above the oil level, means for regulating the flow of oil through the outlet into the channel.

2. In a fuel feeding and atomizing device, an oil feed tank, an air pump, an enclosed channel between the tank and the suction side of th pump, an oil storage tank connected to the oil feed tank, adjustable means for regulating the degree of vacuum in the feed tank to raise the oil from the storage tank, adjustable means for regulating the level of the oil in the feed tank, an oil outlet from the feed tank, said outlet communicating at one end with the tank near the bottom thereof and at the other end with the said channel above the level of the oil, a valve for controlling the flow of oil through the outlet, and means for regulating the degree of vacuum in the said channel, and having means connecting the discharge end of the air pump with the outlet in the tank to increase the velocity of the discharged oil.

3. In an oil feeding and atomizing device, a fuel feed tank, an oil storage tank positioned below the feed tank and connected thereto, an air pump, an enclosed channel connecting the suction side of the pump with the tank, means for regulating the vacuum in the tank to raise the oil from the storage tank into the feed tank, means for regulating the degree of vacuum in the enclosed channel so that it differs from the vacuum in the tank, an oil outlet from the bottom of the tank and communicating with the enclosed channel above the oil level at the other end, means for regulating the flow of oil through the outlet, a float valve for controlling the level of the oil in the tank, a pipe connecting the oil outlet with the discharge end of the air pump to increase the velocity of the discharge, an air fan, the outlet from which surrounds the discharge pipe from the air pump, and a nozzle connected to the discharge pipe from the air pump.

4. A device according to claim 3, in which the feed tank is mounted on rods and the air pump and air fan are driven by a motor, said air pump, fan and motor being coupled together and slidably mounted on the tank supporting rods.

5. In a fuel feeding and atomizing device, a fuel feed tank mounted on vertical supports, an air pump, an air fan, a motor driving said pump and fan, said pump, fan and motor being secured to one another and mounted on the vertical supports so that they can be adjusted, pipe connecting the suction side of the pump with the oil tank, an oil outlet connecting the tank with the pipe, means to regulate the vacuum in the tank, means for regulating the vacuum in the pipe, a valve for regulating the oil discharge, and a discharge pipe from the pump passing through the discharge end of the fan.

6. A fuel feeding apparatus of the character described comprising a fuel feeding tank, a main suction line, means for maintaining a relatively low grade of vacuum in one section of said line and a relatively high grade of vacuum in another section of said line, said means being adjustable to vary the vacuum in both sections of the line without affecting the ratio therebetween, means connecting the low vacuum section of the line to the feed tank to maintain in said tank a constant degree of vacuum sufficient to feed fuel thereto from a lower level and a fuel feed channel having its lower end positioned below the fuel level in said tank and its upper end communicating with the high vacuum section of said suction line at a point above the fuel level.

LOUIS LAVOIE.